US012631309B2

(12) United States Patent
Lee et al.

(10) Patent No.: US 12,631,309 B2
(45) Date of Patent: May 19, 2026

(54) VEHICLE LAMP

(71) Applicant: SL Corporation, Daegu (KR)

(72) Inventors: Dong Gyu Lee, Auburn Hills, MI (US); Jong Ryoul Park, Auburn Hills, MI (US); Andrew P. Evans, Auburn Hills, MI (US)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/924,471

(22) Filed: Oct. 23, 2024

(65) Prior Publication Data

US 2025/0164095 A1 May 22, 2025

Related U.S. Application Data

(60) Provisional application No. 63/601,731, filed on Nov. 21, 2023.

(51) Int. Cl.

| | |
|---|---|
| ***F21S 41/37*** | (2018.01) |
| ***F21S 41/275*** | (2018.01) |
| ***F21S 41/29*** | (2018.01) |
| ***F21S 43/20*** | (2018.01) |
| ***F21S 43/27*** | (2018.01) |
| ***F21S 43/33*** | (2018.01) |
| *F21Y 115/10* | (2016.01) |

(52) U.S. Cl.

CPC ............. *F21S 41/37* (2018.01); *F21S 41/275* (2018.01); *F21S 41/295* (2018.01); *F21S 43/26411* (2024.05); *F21S 43/27* (2018.01); *F21S 43/2817* (2024.05); *F21S 43/331* (2024.05); *F21Y 2115/10* (2016.08)

(58) Field of Classification Search

CPC ........ F21S 41/37; F21S 41/275; F21S 41/295; F21S 43/27; F21S 43/2817; F21S 43/26411; F21S 43/331

See application file for complete search history.

(56) References Cited

U.S. PATENT DOCUMENTS

| | | | | |
|---|---|---|---|---|
| 10,663,652 B2 * | 5/2020 | Angelini | ............ | G02B 27/0955 |
| 12,259,100 B1 * | 3/2025 | Park | ...................... | F21S 41/285 |
| 2013/0135887 A1 * | 5/2013 | Otani | .................... | F21S 41/285 362/516 |
| 2021/0285610 A1 * | 9/2021 | Drüppel | ................ | F21S 41/285 |
| 2024/0151379 A1 * | 5/2024 | Suzuki | .................... | F21S 41/36 |
| 2025/0237364 A1 * | 7/2025 | Mügge | .................. | F21S 43/239 |
| 2025/0277569 A1 * | 9/2025 | Yamamoto | ............. | F21S 41/24 |

* cited by examiner

*Primary Examiner* — Christopher E Dunay

(74) *Attorney, Agent, or Firm* — United One Law Group LLC; Kongsik Kim; Jhongwoo Peck

(57) ABSTRACT

A vehicle lamp includes a light source unit generating light; a first lens unit including an emission surface to emit the light and at least one reflective surface to reflect the light toward the emission surface; and a deposit layer provided on the at least one reflective surface to reflect the light from the light source unit. A vehicle lamp includes a light source unit generating light; a first lens unit including an outer lens unit that includes an emission surface formed as a closed-loop structure to emit the light, and a reflective surface to reflect the light toward the emission surface, and an inner lens unit along an inner periphery of the emission surface to face the reflective surface; and a deposit layer provided on the reflective surface and/or the inner lens unit to reflect the light from the light source unit.

18 Claims, 20 Drawing Sheets

VEHICLE LAMP

CROSS-REFERENCE TO RELATED APPLICATION(S)

This application claims priority from Provisional Application No. 63/601,731 filed Nov. 21, 2023, which is incorporated herein by reference in its entirety.

BACKGROUND

1. Technical Field

The present disclosure relates to a vehicle lamp, and more specifically, to a vehicle lamp that includes a hollow space formed inside a first lens unit and a deposit layer formed on a reflective surface to provide a three-dimensional (3D) lighting image.

2. Description of the Related Art

Generally, vehicles are equipped with various types of lamps that serve the illumination function to allow objects around them to be more easily identified during low-light conditions (e.g., nighttime driving), and the signaling function to inform other vehicles or road users of their driving status.

For example, vehicle lamps include head lamps and fog lamps mainly for illumination purposes as well as turn signal lamps, tail lamps, brake lamps, and side markers for signaling purposes. These vehicle lamps are regulated by law to ensure that their respective functions are fully performed and that the required installation standards and specifications are satisfied.

Among vehicle lamps, head lamps play a very important role in ensuring safe driving by forming low beam or high beam patterns to secure the drivers' forward visibility when driving in dark environments, such as at night.

These head lamps may be provided as single lamp modules that selectively form low beam or high beam patterns depending on the inclusion of shield members, or as separate lamp modules for separately forming low beam patterns and for forming high beam patterns.

Conventionally, only functional aspects such as illumination and signaling have been considered for vehicle lamps, but recently, the significance of lamp design has been steadily increasing.

In other words, in addition to the functional aspect of ensuring the drivers' visibility, which aids safe driving, the aesthetic aspect of vehicle lamps, improved through design, significantly influences consumers' purchase decision for vehicles.

To this end, research to enhance exterior design by forming various lighting images through vehicle lamps is actively underway.

SUMMARY

Aspects of the present disclosure provide a vehicle lamp that includes a hollow space formed within a first lens unit and a deposit layer formed on a reflective surface to provide a three-dimensional (3D) lighting image.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a light source unit that generates light; a first lens unit including an emission surface through which the light from the light source unit is emitted to exterior, and at least one reflective surface that is bent from the emission surface toward the light source unit along an outer periphery of the emission surface to reflect the light from the light source unit toward the emission surface; and a deposit layer provided on the at least one reflective surface to reflect the light from the light source unit.

The at least one reflective surface may include at least a first opposing region and a second opposing region, and the first opposition region and the second opposing region may be spaced apart by a set distance to form a light distribution space therebetween.

The deposit layer may be provided on outer sides of the first opposing region and the second opposing region. The deposit layer may be provided on inner sides of the first opposing region and the second opposing region. The deposit layer may be provided on the outer side of one of the first opposing region or the second opposing region and on the inner side of the other of the first opposing region or the second opposing region.

The deposit layer that is provided on at least one of the first opposing region or the second opposing region may allow partial light transmission. The deposit layer that allows partial light transmission may have a transmittance in a range of about 1% to about 50%. A reflective surface with the deposit layer that allows partial light transmission may form a half-mirror image.

The vehicle lamp may further include a second lens unit interposed between the light source unit and the first lens unit to refract the light from the light source unit toward the light distribution space.

The deposit layer may be formed by depositing a thin film containing at least one of aluminum, nickel, or chrome on the at least one reflective surface, or by insert-molding a chrome-deposited film onto the at least one reflective surface.

According to another aspect of the present disclosure, a vehicle lamp may include a light source unit that generates light; a first lens unit, which includes an outer lens unit that includes an emission surface through which the light from the light source unit is emitted to exterior and is formed as a closed-loop structure, and a reflective surface that is bent from the emission surface toward the light source unit along an outer periphery of the emission surface to reflect the light from the light source unit toward the emission surface, and an inner lens unit that is extended between the light source unit and the emission surface along an inner periphery of the emission surface to face the reflective surface; and a deposit layer provided on the reflective surface and/or the inner lens unit to reflect the light from the light source unit.

The reflective surface and the inner lens unit may be spaced apart by a set distance to form a light distribution space therebetween.

The deposit layer may be provided on outer sides of the reflective surface and the inner lens unit. The deposit layer may be provided on inner sides of the reflective surface and the inner lens unit. The deposit layer may be provided on the outer side of one of the reflective surface or the inner lens unit and on the inner side of the other of the reflective surface or the inner lens unit.

The deposit layer that is provided on at least one of the reflective surface or the inner lens unit may allow partial light transmission. The deposit layer that allows partial light transmission may have a transmittance in a range of about 1% to about 50%. The reflective surface or the inner lens unit with the deposit layer that allows partial light transmission may form a half-mirror image.

The vehicle lamp may further include a second lens unit interposed between the light source unit and both the outer lens unit and inner lens unit to refract the light from the light source unit toward the light distribution space.

The deposit layer may be formed by depositing a thin film containing at least one of aluminum, nickel, or chrome on the reflective surface, or by insert-molding a chrome-deposited film onto the reflective surface.

The outer lens unit and the inner lens unit may be detachably coupled, and the deposit layer may be formed in a state where the inner lens unit is detached from the outer lens unit.

The vehicle lamp may further include a connection means that fixes the outer lens unit and the inner lens unit at set positions; and a bezel that is disposed on the connection means and bears no overlapping region with the emission surface with regards to a direction perpendicular to the emission surface.

When the outer lens unit and the inner lens unit are installed on the connection means, a gap of a predetermined distance may be formed where the emission surface and one end of the inner lens unit are adjacent to each other.

The aforementioned and other embodiments of the present disclosure can provide the following benefits. First, by forming a light distribution space inside a first lens unit as a void space, the overall weight of the vehicle lamp can be reduced. Second, by providing a deposit layer in the first lens unit, light can be totally internally reflected or partially transmitted, allowing for the implementation of a 3D lighting image. Third, even if the first lens unit becomes thicker, a reduction in light efficiency when using a red lens can be prevented.

It should be noted that the effects of the present disclosure are not limited to those described above, and other effects of the present disclosure will be apparent from the following description.

BRIEF DESCRIPTION OF THE DRAWINGS

The detailed description of the exemplary embodiments of this application described below, as well as the summary described above, will be better understood when read in conjunction with the accompanying drawings. The drawings illustrate exemplary embodiments of the present disclosure for illustrative purposes. However, it should be understood that the application is not limited to the exact arrangements and means shown.

DETAILED DESCRIPTION

Figure 1:
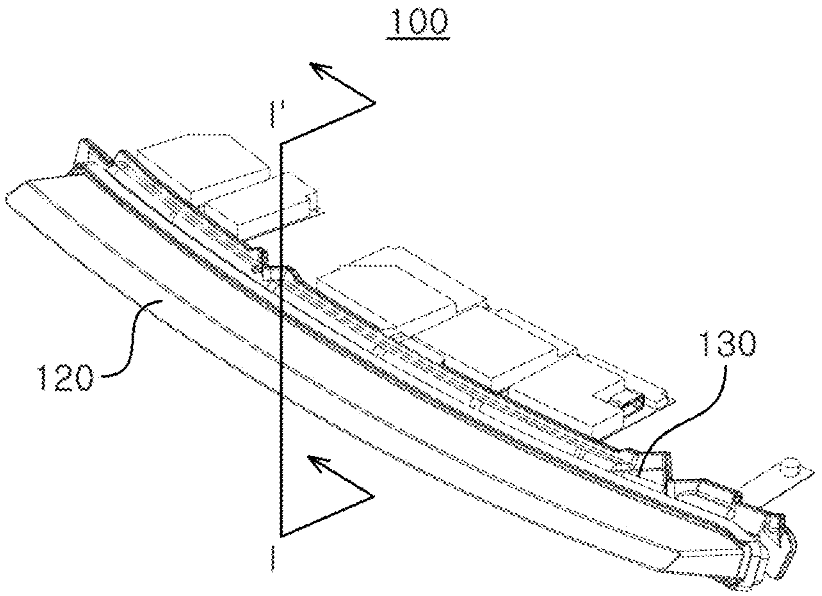
FIG. 1 is a perspective view illustrating a vehicle lamp according to an embodiment of the present disclosure.

The present disclosure can encompass various modifications and have various embodiments, and specific exemplary embodiments will be illustrated and described in the drawings.

However, this is not intended to limit the present disclosure to such specific embodiments, and it should be understood to include all modifications, equivalents, and alternatives within the spirit and scope of the disclosure.

Terms including ordinal numbers such as first, second, etc., may be used to describe various components and distinguish one component from another, but the order of these components are not limited by these terms. For example, a second component can be named a first component without departing from the scope of the disclosure, and similarly, a first component can be named a second component.

The term "and/or" includes any combination of one or more of the associated listed items or any of the listed items individually.

When a component is said to be "connected to" or "coupled to" another component, it may be directly connected or coupled to the other component, or intervening components may be present. Conversely, when a component is said to be "directly connected to" or "directly coupled to" another component, there are no intervening components.

The terms used in this application are for the purpose of describing particular embodiments only and are not intended to limit the invention.

Unless the context clearly indicates otherwise, the singular forms include the plural forms as well.

In this application, the terms "comprising" or "including" are intended to specify the presence of stated features, numbers, steps, operations, elements, components, or combinations thereof, but do not preclude the presence or addition of one or more other features, numbers, steps, operations, elements, components, or combinations thereof.

Embodiments will hereinafter be described with reference to the accompanying drawings, wherein the same or corresponding components, regardless of the drawing numbers, are assigned the same reference numbers, and redundant descriptions will be omitted.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
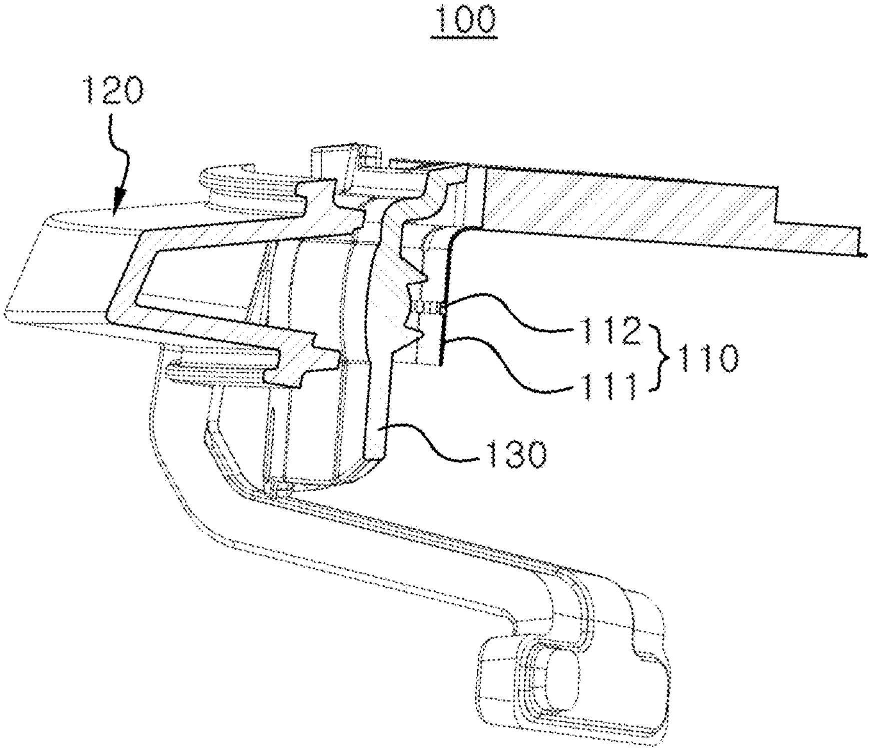
FIG. 2 is a partial cross-sectional view illustrating the region along line I-I' of FIG. 1.
Figure 3:
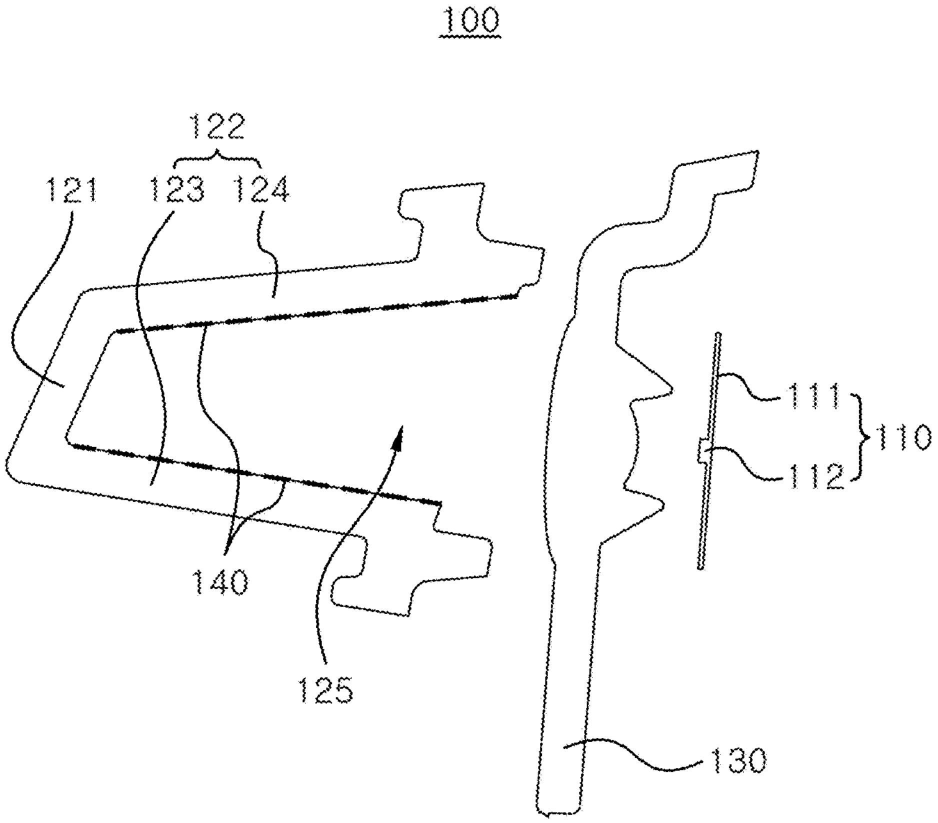
FIG. 3 is a simplified cross-sectional view illustrating the vehicle lamp of FIG. 2.

FIG. 1 is a perspective view illustrating a vehicle lamp according to an embodiment of the present disclosure, FIG. 2 is a partial cross-sectional view illustrating the region along line I-I' of FIG. 1, and FIG. 3 is a simplified cross-sectional view illustrating the vehicle lamp of FIG. 2.

Referring to FIGS. 1-3, a vehicle lamp 100 according to an embodiment of the present disclosure may include a light source unit 110, a first lens unit 120, a second lens unit 130, and a deposit layer 140.

First, the light source unit 110 may generate light. The light source unit 110 may include a plurality of light sources 112 that are attached to a substrate 111 and generate light, and may emit the light in a direction substantially perpendicular to the substrate 111.

Additionally, the light source unit 110 may generate light with a suitable light intensity and/or color for the purpose of the vehicle lamp 100. As one example, the light source unit 110 may employ a semiconductor light-emitting element such as a light-emitting diode (LED), but the present disclosure is not limited thereto. Alternatively, the light source unit 110 may employ a laser diode (LD) or a bulb-type lamp as its light source.

Furthermore, the light source unit 110 may be configured for surface emission to more efficiently form the lighting image of the vehicle lamp 100. Accordingly, the light source unit 110 may include a surface-emitting LED or a surface-emitting plate. The light source unit 110 may be designed for surface emission to form a substantially uniform lighting image. If the light source unit 110 emits point light instead of surface light, the brightness of the light source unit 110 may undesirably become uneven, potentially causing hot spots in the three-dimensional (3D) lighting image.

The first lens unit 120 may become the region where the lighting image of the vehicle lamp 100 is displayed. The first lens unit 120 may be exposed to the exterior of a vehicle, or may be disposed within a transparent cover provided in the vehicle lamp 100.

The first lens unit 120 may include an emission surface 121 and a reflective surface 122. The emission surface 121 may be a region through which at least some of the light from the light source unit 110 is emitted to the exterior, and a 3D lighting image may be formed on the emission surface 121. The emission surface 121 may be disposed at the outer side of the vehicle lamp 100 and may be formed as either a curved or flat surface depending on the shape of the body of the vehicle.

Furthermore, the reflective surface 122 may extend in the direction of the light source unit 110 along the outer boundary (e.g., periphery) of the emission surface 121. The reflective surface 122 may be formed as either a curved or flat surface to correspond to the shape of the emission surface 121. In this embodiment, the emission surface 121 may be rectangular, and the reflective surface 122 may be disposed to surround the emission surface 121 by four sides. Thus, the first lens unit 120 may be implemented in the form of a bar with a substantially elongated cuboid shape.

The reflective surface 122 may include at least a first opposing region 123 and a second opposing region 124. The first opposing region 123 may be spaced apart from the second opposing region 124 by a set distance, and a light distribution space 125 may be formed in the space between the first and second opposing regions 123 and 124. The vehicle lamp 100, which has an elongated shape along its lengthwise direction, may further include a third opposing region and a fourth opposing region adjacent to the first or second opposing region 123 or 124 on both lateral sides.

As illustrated in FIG. 3, the reflective surface 122 may extend in a direction perpendicular to the emission surface 121, or may extend at a set angle. Therefore, in some embodiments, the first and second opposing regions 123 and 124 may be arranged non-parallel to each other.

Additionally, the second lens unit 130 may refract the light generated by the light source unit 110 in the direction of the first lens unit 120. To achieve this, the second lens unit 130 may be disposed in front of the light source unit 110 and behind the first lens unit 120 along the direction of light emission.

Furthermore, the deposit layer 140 may be provided on the reflective surface 122 and may reflect at least some of the light emitted from the light source unit 110 in the direction of the emission surface 121. For example, the deposit layer 140 may be formed by depositing a thin film containing at least one of aluminum (Al), nickel (Ni), or chrome (Cr) on the reflective surface 122, or by insert-molding a Cr-deposited film onto the reflective surface 122.

The deposit layer 140 may fully reflect the light from the light source unit 110, or may transmit some of the light while reflecting the remaining light.

Figure 4:
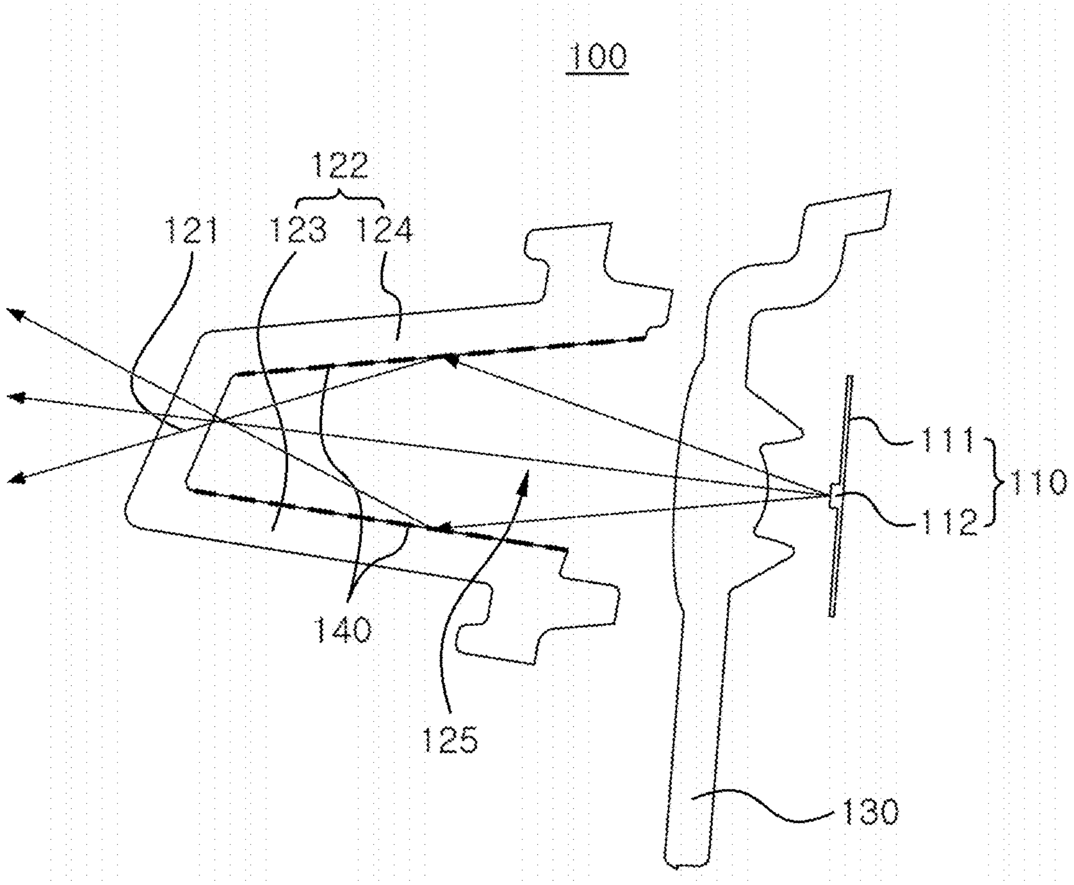
FIG. 4 is a reference diagram that schematically illustrates the path of light in the vehicle lamp of FIG. 3.
Figure 5:
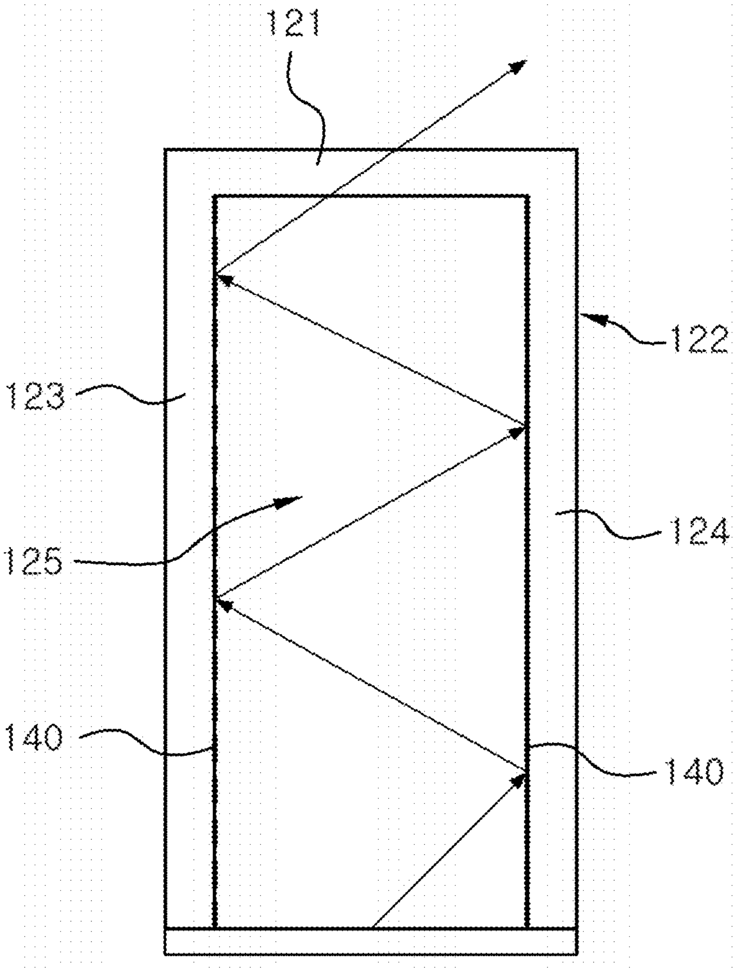
FIG. 5 is a reference diagram that schematically illustrates the total internal reflection of light inside the first lens unit of the vehicle lamp of FIG. 4.

FIG. 4 is a reference diagram that schematically illustrates the path of light in the vehicle lamp of FIG. 3, and FIG. 5 is a reference diagram that schematically illustrates the total internal reflection of light inside the first lens unit of the vehicle lamp of FIG. 4.

Referring to FIGS. 4 and 5, the deposit layer 140 may be disposed on the inner side of the reflective surface 122. That is, the deposit layer 140 may be formed on the inner sides of the first opposing region 123 and the second opposing region 124.

In this case, the deposit layer 140 may have about 0% transmittance. Thus, all or nearly all the light that passes through the second lens unit 130 may be emitted only through the emission surface 121, and no lighting may occur on the reflective surface 122 unlike the emission surface 121. In other words, a lighting image may be implemented on the emission surface 121, and the reflective surface 122 may remain unlit, showing only its exterior shape.

In some embodiments, the deposit layer 140 may be provided on the outer side of the reflective surface 122. If the deposit layer 140 is arranged on the outer side of the reflective surface 122, a relatively darker exterior image may be presented compared to when the deposit layer 140 is provided on the inner side of the reflective surface 122.

Figure 6:
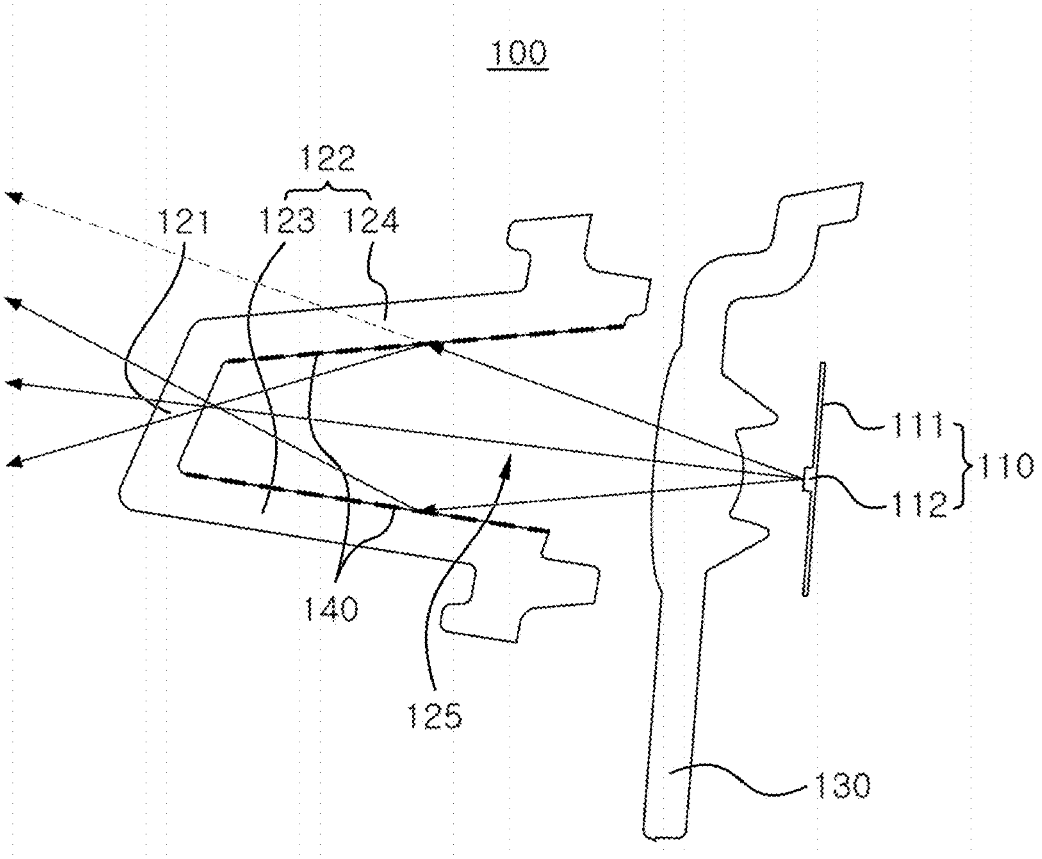
FIG. 6 is a reference diagram that schematically illustrates an alternative path of light in the vehicle lamp of FIG. 3.
Figure 7:
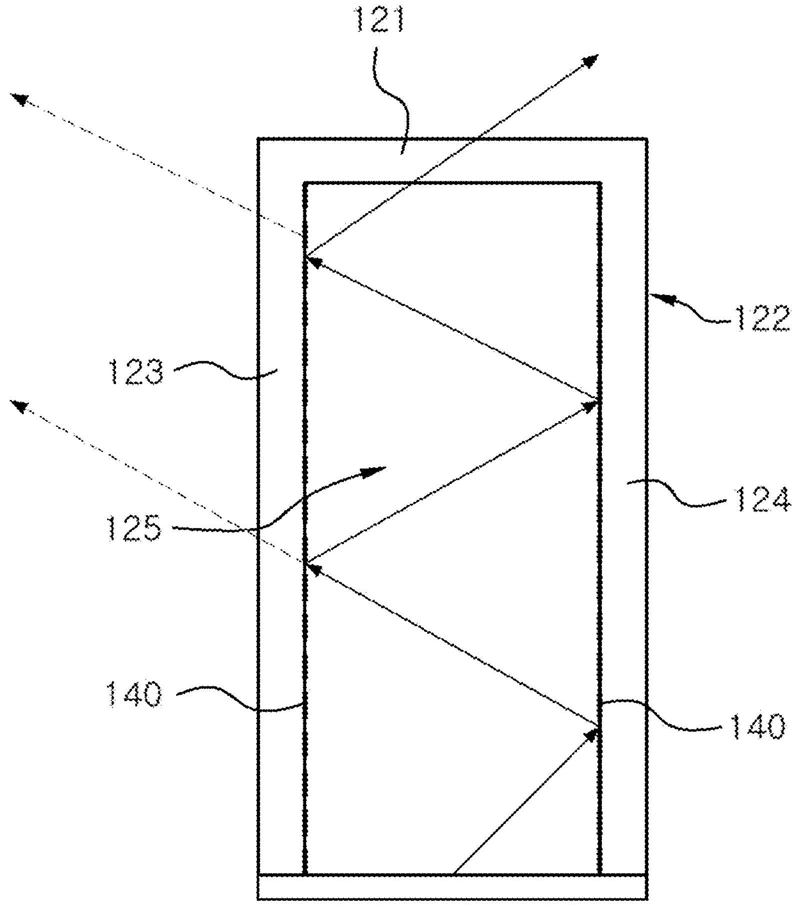
FIG. 7 is a reference diagram that schematically illustrates some light passing through the reflective surface inside the first lens unit of the vehicle lamp of FIG. 6.

FIG. 6 is a reference diagram that schematically illustrates an alternative path of light in the vehicle lamp of FIG. 3, and FIG. 7 is a reference diagram that schematically illustrates some light passing through the reflective surface inside the first lens unit of the vehicle lamp of FIG. 6.

Referring to FIGS. 6 and 7, the deposit layer 140 may be disposed on the inner side of the reflective surface 122. The deposit layer 140 may have about 0% transmittance on the first opposing region 123 and may have a transmittance in the range of about 1% to about 50% on the second opposing region 124. Therefore, while some light is emitted through the emission surface 121, creating a lighting image on the emission surface 121, some light may also be emitted through the second opposing region 124, producing a separate half-mirror image. Naturally, depending on the transmittance of the deposit layer 140 or the deposition pattern formed on the reflective surface 122, various shapes and/or brightness levels of lighting images may be implemented.

In some embodiments, the deposit layer 140 may be implemented on both the first and second opposing regions 123 and 124 to have a transmittance in the range of about 1% to about 50%, such that a half-mirror image may be produced in both the first and second opposing regions 123 and 124.

FIGS. 8A-8D are reference diagrams illustrating various embodiments for the position of the deposit layer in the vehicle lamp of FIG. 3. Referring to FIG. 8A-8D, the deposit layer 140 may be selectively disposed on either the inner side or outer side of each reflective surface 122.

Figure 8A:
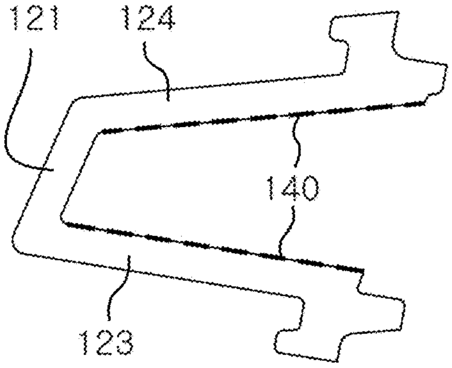
FIGS. 8A-8D are reference diagrams illustrating various embodiments for the position of the deposit layer in the vehicle lamp of FIG. 3.
Figure 8B:
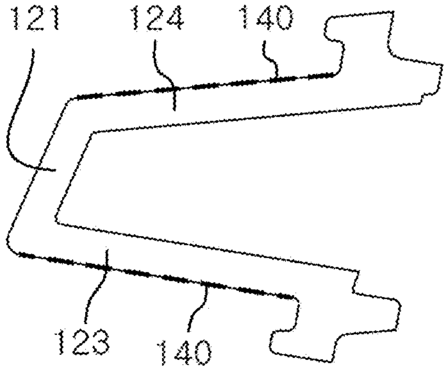
Figure 8C:
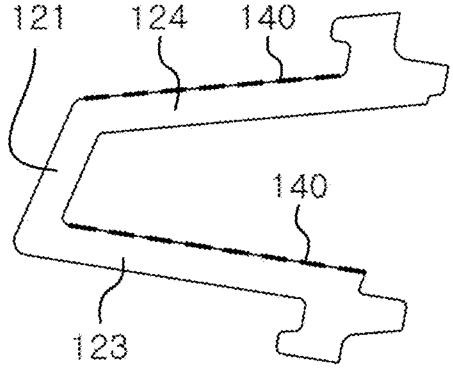
Figure 8D:
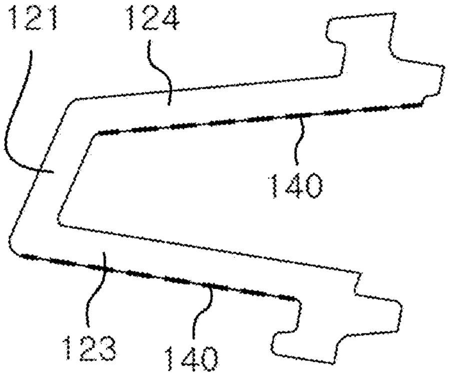

For example, as illustrated in FIG. 8A, the deposit layer 140 may be formed on the inner sides of the first and second opposing regions 123 and 124. Alternatively, as illustrated in FIG. 8B, the deposit layer 140 may be formed on the outer sides of the first and second opposing regions 123 and 124. As illustrated in FIG. 8C, the deposit layer 140 may be formed on the inner side of the first opposing region 123 and the outer side of the second opposing region 124. Further, the deposit layer 140 may be formed on the outer side of the first opposing region 123 and the inner side of the second opposing region 124, as illustrated in FIG. 8D.

As described above, the deposit layer 140 may be selectively formed on either the inner side or outer side of the reflective surface 122. When the deposit layer 140 is formed on the outer side of the reflective surface 122, a relatively darker exterior image may be produced compared to when the deposit layer 140 is formed on the inner side of the reflective surface 122.

Figure 9:
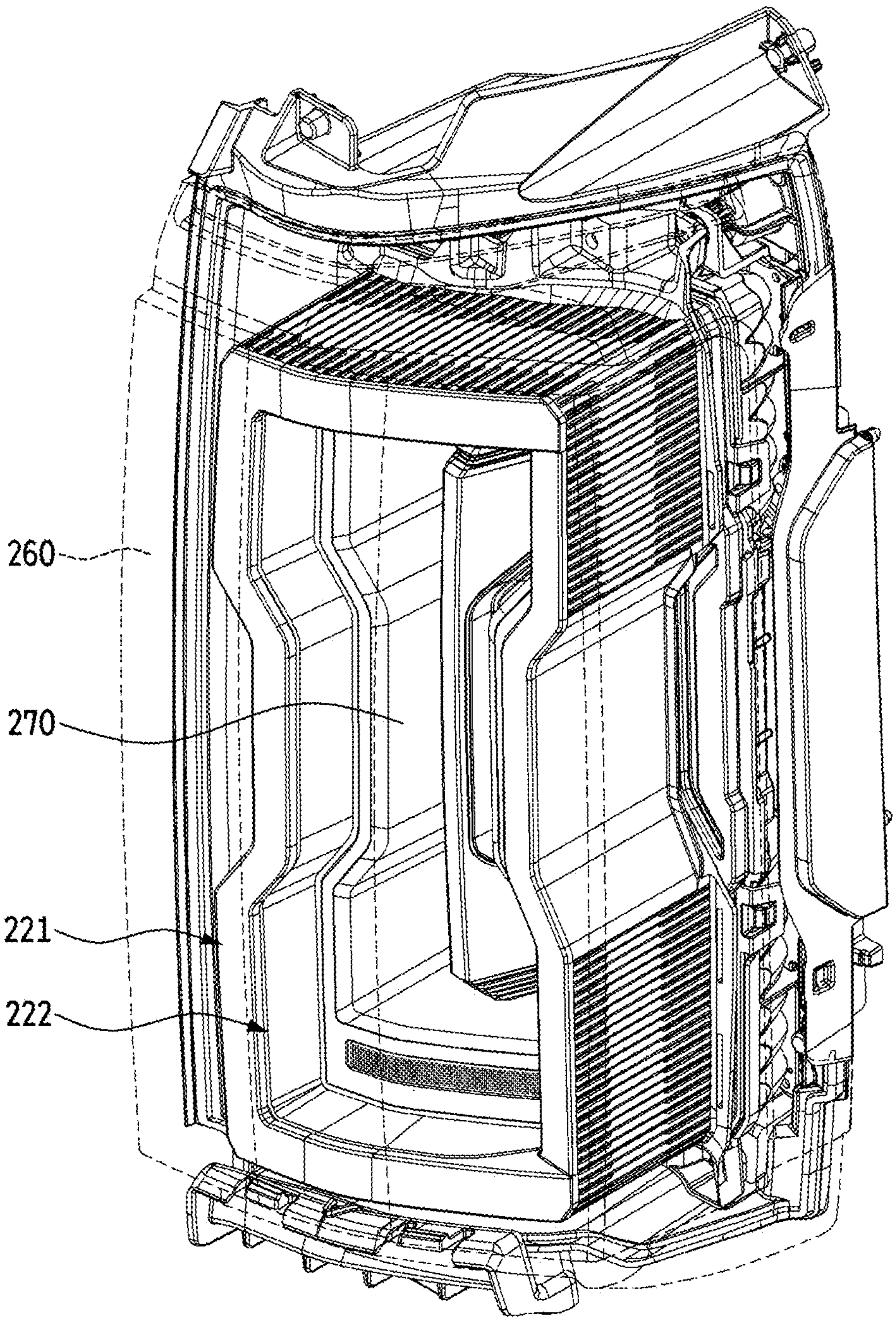
FIG. 9 is a perspective view illustrating a vehicle lamp according to another embodiment of the present disclosure.
Figure 10:
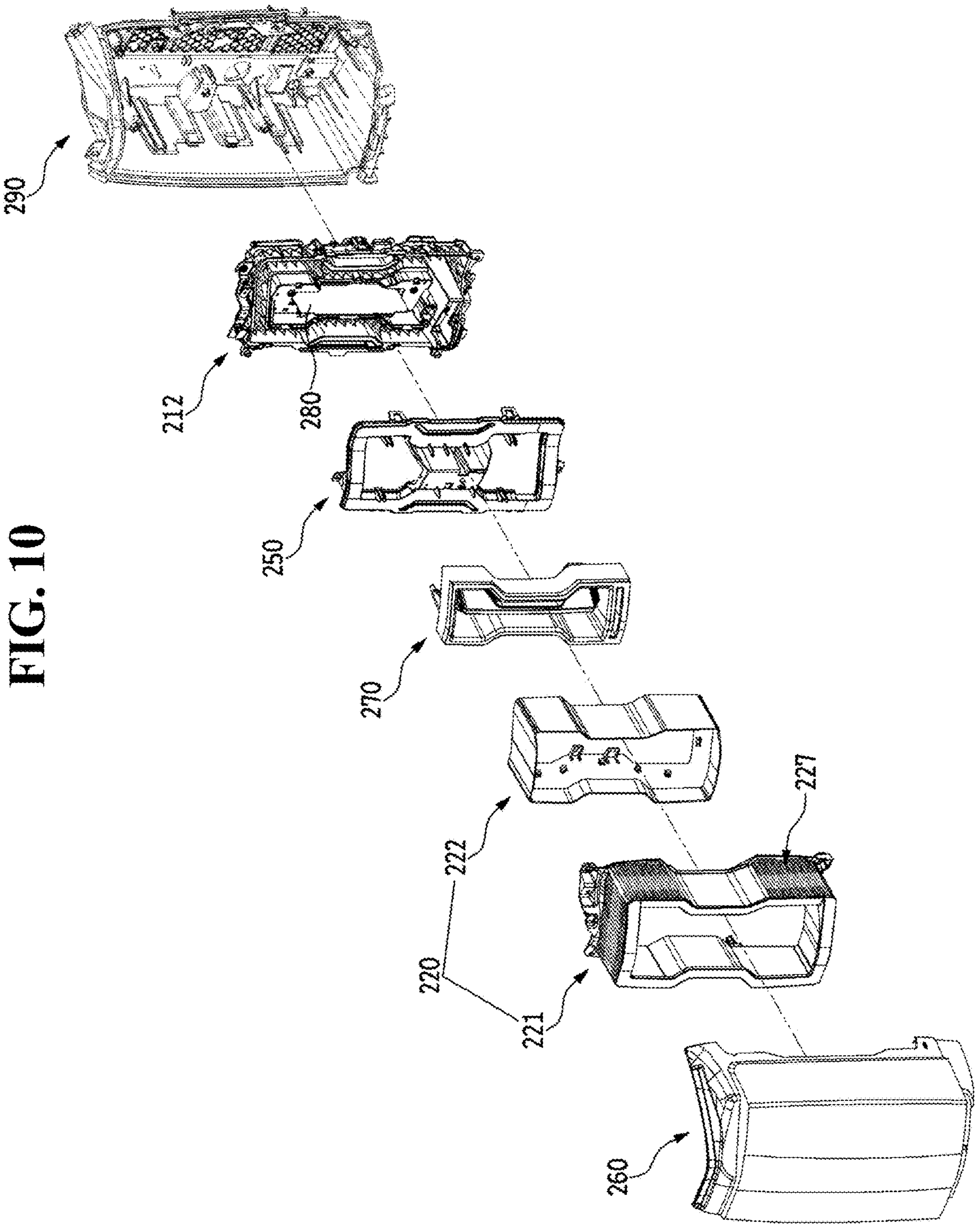
FIG. 10 is an exploded perspective view of the vehicle lamp of FIG. 9.
Figure 11:
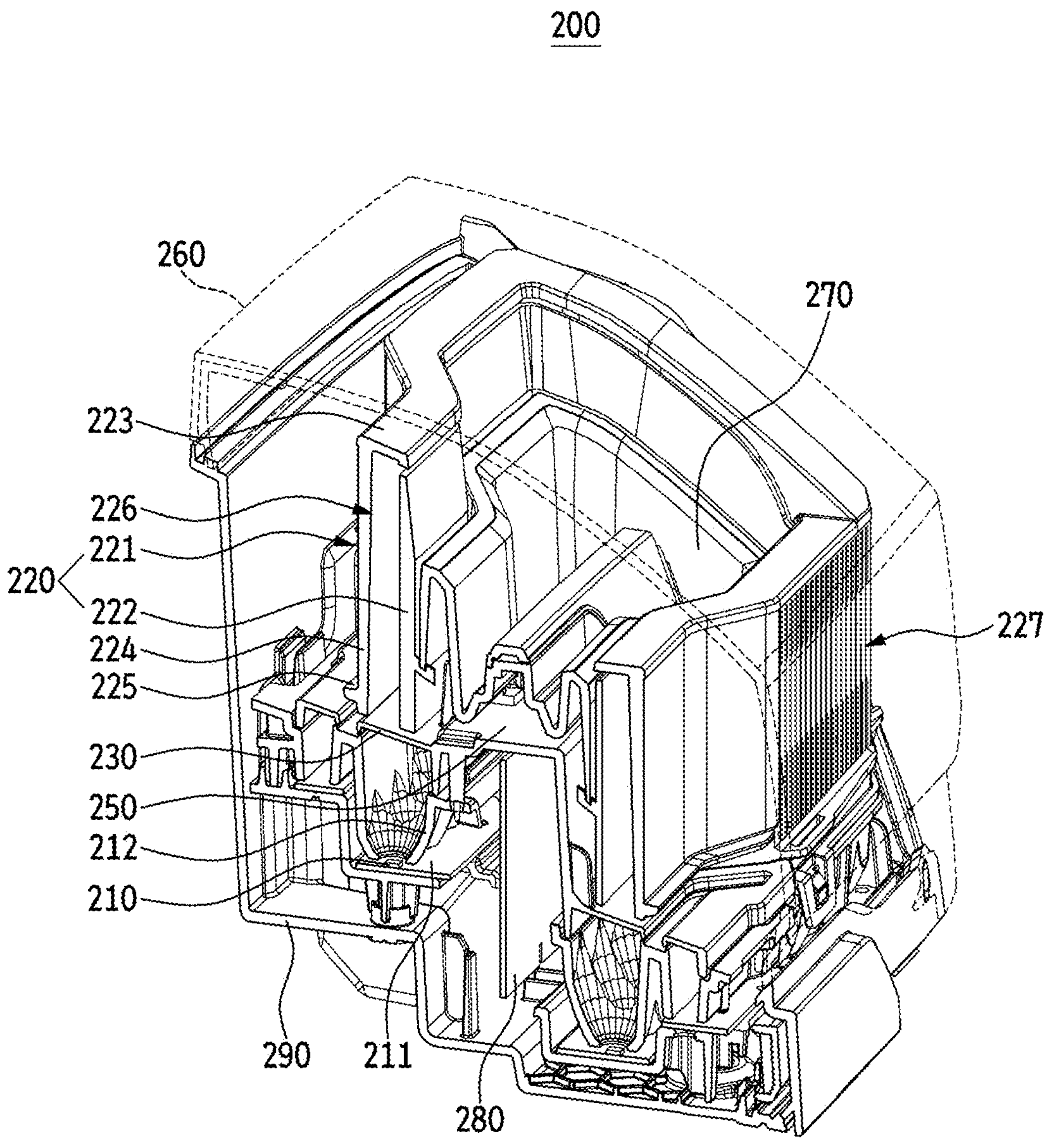
FIGS. 11 and 12 are cross-sectional views illustrating the region along line II-II' of FIG. 9.
Figure 12:
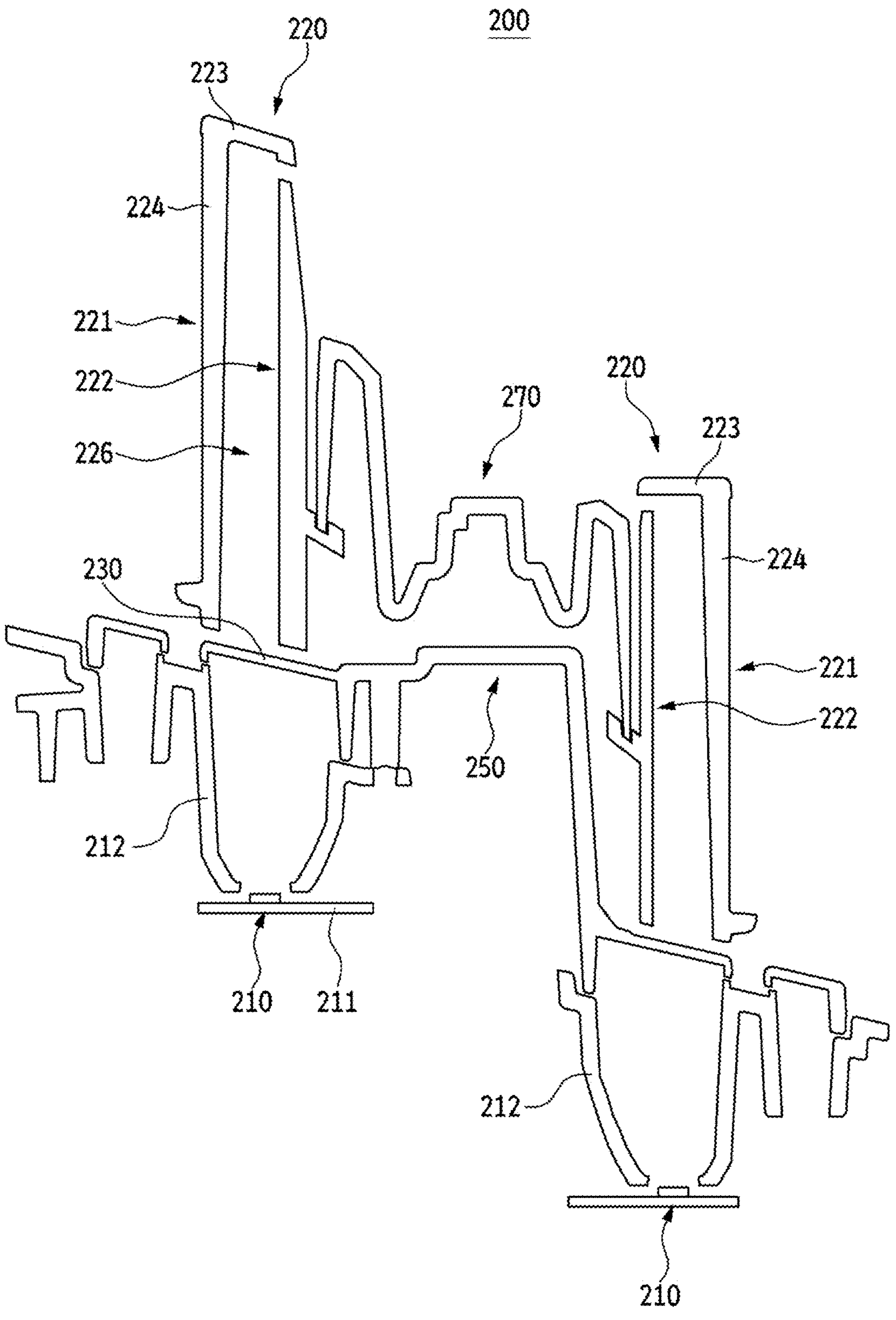

FIG. 9 is a perspective view illustrating a vehicle lamp 200 according to another embodiment of the present disclosure, FIG. 10 is an exploded perspective view of the vehicle lamp 200 of FIG. 9, and FIGS. 11 and 12 are cross-sectional views illustrating the region along line II-II' of FIG. 9.

Referring to FIGS. 9-12, the vehicle lamp 200 may include a light source unit 210, a first lens unit 220 that includes an outer lens unit 221 and an inner lens unit 222, a second lens unit 230, a deposit layer 240, a connection means 250, a cover top 260, a bezel 270, an LED drive module (LDM) 280, and a cover bottom 290.

The light source unit 210 may be substantially identical in terms of the structure to the light source unit 110 of FIG. 2, and thus, a redundant explanation will be omitted. However, in the vehicle lamp 200, the outer lens unit 221 may form a connected closed-loop structure when viewed from the top with respect to the orientation shown in FIG. 12. Accordingly, the arrangement or quantity of the light source unit 210 may be adjusted. Additionally, the light source unit 210 may include a substrate 211, on which a plurality of light sources, e.g., those implemented as LEDs, are mounted, and a light guide portion 212 that guides light toward the second lens unit 230. The light source unit 210 may include a plurality of light sources installed on the substrate 211 along the closed loop structure of the first lens unit 220.

Additionally, the outer lens unit 221 may include an emission surface 223 and a reflective surface 224. The emission surface 223 may have a different shape from its counterpart of FIG. 2, but since the functions and effects are similar, a redundant explanation will be omitted. The emission surfaces 223 may be connected in the closed-loop structure in accordance with the shape of the outer lens unit 221, which may be a combination of curved and flat surfaces in some areas. Furthermore, the emission surfaces 223 of the closed-loop structure may be partially formed with different depths (or heights) in the front and rear directions of the vehicle in the installed state.

Furthermore, the reflective surface 224 may be bent in the direction of the light source unit 210 along the outer boundary of the emission surface 223, which is one end of the reflective surface 224. The reflective surface 224 may reflect at least some of the light from the light source unit 210 toward the emission surface 223. Light may be emitted through the outer surface of the reflective surface 224 depending on the transmittance of the deposit layer 240, which will be described later. In this case, when light is emitted through the reflective surface 224, a reflective surface pattern 227 that displays a lighting image may be provided. The reflective surface pattern 227 may be formed in various shapes and directions on the outer surface of the reflective surface 224.

Additionally, the inner lens unit 222 may be detachably arranged within the outer lens unit 221. In this case, the inner lens unit 222 may be disposed to face the reflective surface 224. Alternatively, the reflective surface 224 and the inner lens unit 222 may be arranged parallel to each other, or may be arranged at a predetermined angle not to be parallel. A light distribution space 226 may be formed in the space between the outer lens unit 221 and the inner lens unit 222. The light distribution space 226 may be formed as a continuous space corresponding to the closed-loop structure of the emission surface 223.

Since the outer lens unit 221 and the inner lens unit 222 are designed to be separable, the deposit layer 240 may be formed more easily on the inner side of the reflective surface 224 and the outer side of the inner lens unit 222.

In some embodiments, the inner lens unit 222 may be integrally formed with the outer lens unit 221. For example, the deposit layer 240 may be formed in a state where the inner lens unit 222 is detached from the outer lens unit 221.

Additionally, the length (or width) of the emission surface 223 may be substantially smaller than the length (or height) of the reflective surface 224. When the length of the emission surface 223 is smaller than the reflective surface 224, the length of the light distribution space 226 may increase. If a red lens with low transmittance with the light distribution space 226 is used to fill the light distribution space 226, it may significantly reduce light efficiency. However, since the light distribution space 226 is formed as an empty space, the red lens can still perform its functions as a tail lamp or functional lamp.

Additionally, the second lens unit 230 may provide a function for diffusing light emitted from the light source unit 210 in the direction of the emission surface 223. The second lens unit 230 may be arranged to cover at least one side of the light distribution space 226 between the reflective surface 224 and the inner lens unit 222. In this case, the second lens unit 230 may block light from being emitted to regions other than the light distribution space 226. The second lens unit 230 may be coupled to and supported by the light guide portion 212.

Further, the light guide portion 212 may be disposed between the light source unit 210 and the second lens unit 230. The light guide portion 212 may refract light emitted from each light source toward the second lens unit 230. The light guide portion 212 may also be provided with a plurality of light refracting regions corresponding to each light source, and the light guide portion 212 may be arranged to correspond to the closed loop structure of the outer lens unit 221.

The second lens unit 230 may be formed to correspond to the first lens unit 220 as it is arranged in a closed loop structure, and the opposite portions of the second lens unit 230 may be connected by the connection means 250.

The deposit layer 240 will be described in detail with reference to FIG. 13.

Additionally, the connection means 250 may be disposed to connect the second lens unit 230 on both sides thereof. The connection means 250 may be formed integrally with each second lens unit 230. The connection means 250 may be disposed at a location where it bears no overlapping region with the emission surface 223 with regards to a direction perpendicular to the emission surface 223. In other words, the connection means 250 may not overlap with the emission surface 223 when viewed from a direction perpendicular to the emission surface 223. The connection means 250 may connect the second lens units 230 on both sides, even when their heights (e.g., vertical positions as shown in FIG. 13) differ.

The connection means 250 may fix the outer lens unit 221 and the inner lens unit 222 at set positions. The connection means 250 may be coupled to or supported by the light guide portion 212, along with the second lens unit 230. In other words, the first lens unit 220, the second lens unit 230, and the light source unit 210 may be installed as a single module within the connection means 250. Therefore, when the outer lens unit 221 and the inner lens unit 222 are secured to the connection means 250, the installation of the outer lens unit 221 and the inner lens unit 222 in a vehicle as a single module can be facilitated. Alternatively, the connection means 250 may be replaced by a part of the body of the vehicle, where the outer lens unit 221 and the inner lens unit 222 are fixed.

Additionally, the cover top 260 may be provided to cover the outer perimeter of the first lens unit 220. The cover top 260 may further include a lens structure capable of adjusting the direction and/or pattern of the light emitted from the first lens unit 220.

Further, the bezel 270 may be disposed to cover the upper region of the connection means 250 from the inside of the first lens unit 220. The bezel 270 may be disposed to be coupled to or supported by the inner lens unit 222 or the connection means 250.

The LDM 280 may be disposed below the connection means 250 and may control the lighting of each LED provided in the light source unit 210.

The cover bottom 290 may be coupled to the front end of the cover top 260 and disposed to cover the rear of the light source unit 210. The cover bottom 290 may be coupled to the body of the vehicle, securing the vehicle lamp to the vehicle.

Figure 13:
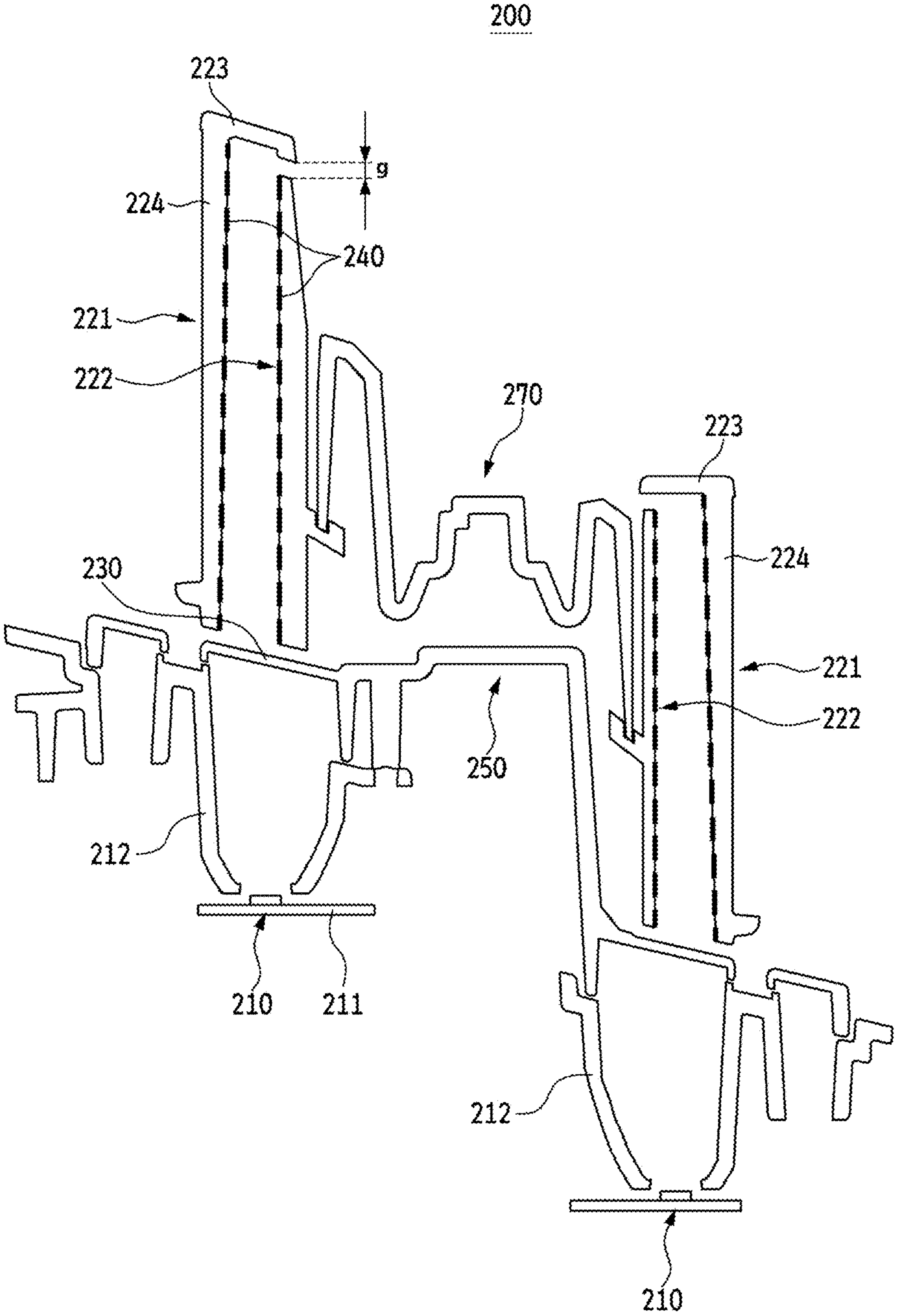
FIG. 13 is a cross-sectional view illustrating the vehicle lamp of FIG. 12.
Figure 14:
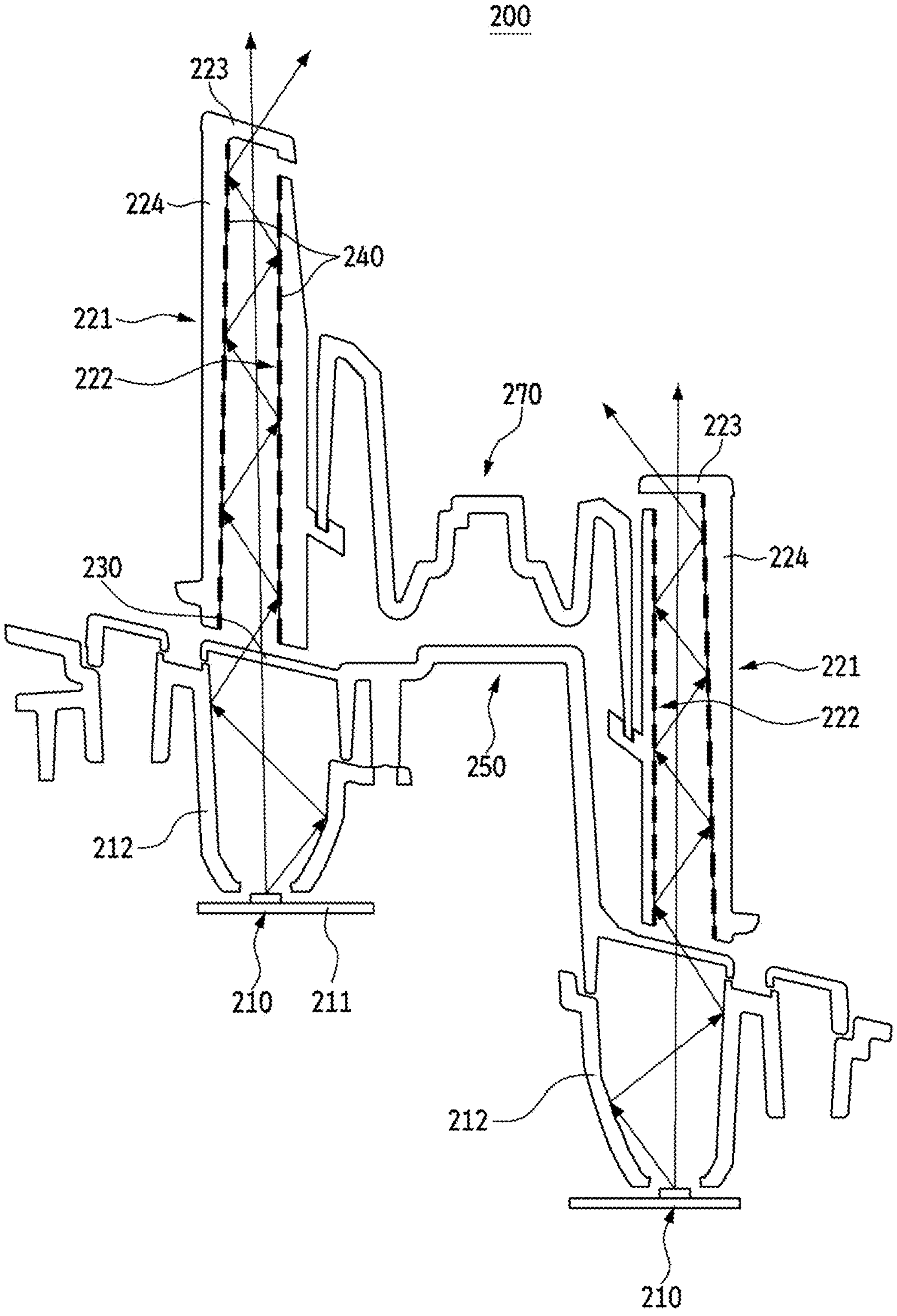
FIG. 14 is a reference diagram schematically illustrating the total internal reflection of light in the vehicle lamp of FIG. 13.
Figure 15:
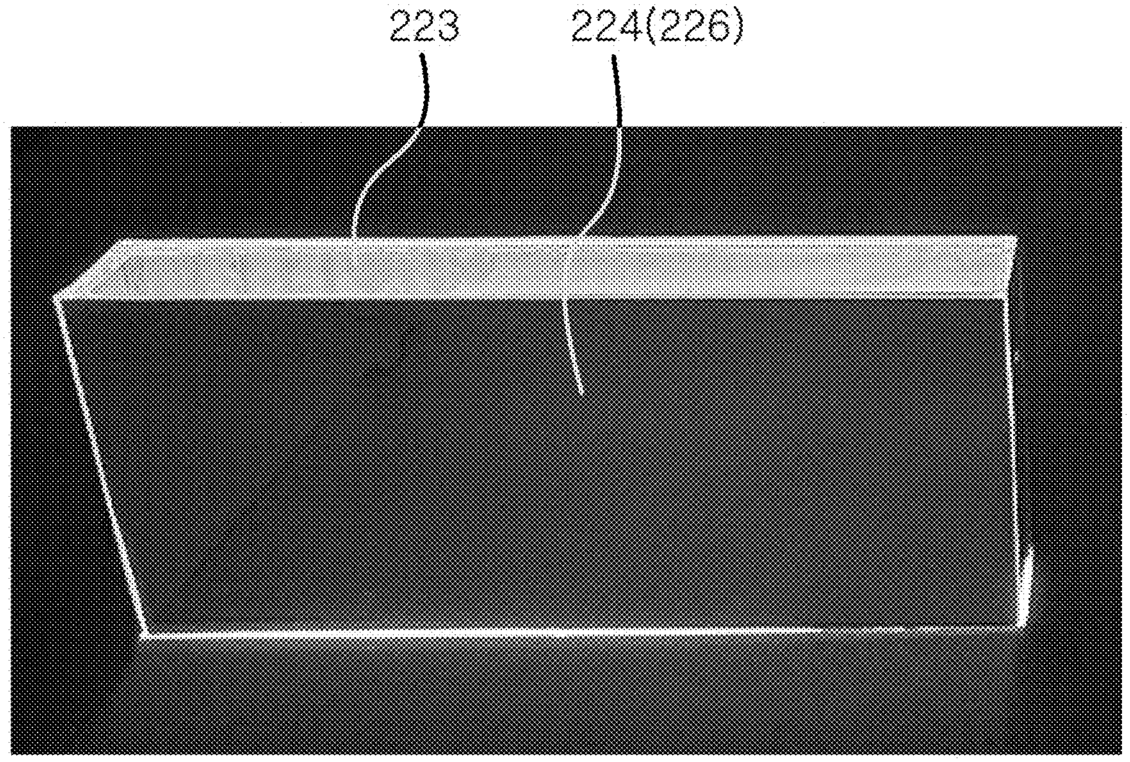
FIG. 15 is a reference photograph showing the total internal reflection of light on the emission surface of the vehicle lamp of FIG. 14.

FIG. 13 is a cross-sectional view illustrating the vehicle lamp of FIG. 12, FIG. 14 is a reference diagram schematically illustrating the total internal reflection of light in the vehicle lamp of FIG. 13, and FIG. 15 is a reference photograph showing the total internal reflection of light on the emission surface of the vehicle lamp of FIG. 14.

Referring to FIGS. 13-15, the deposit layer 240 may be disposed on the inner sides of the reflective surface 224 and the inner lens unit 222. For example, the deposit layer 240 may be formed by depositing a thin film containing at least one of aluminum (Al), nickel (Ni), or chrome (Cr) on the reflective surface 224, or by insert-molding a Cr-deposited film onto the reflective surface 224.

In this case, the deposit layer 240 may have a transmittance of about 0%, meaning that all or nearly all of the light passing through the second lens unit 230 may be emitted solely through the emission surface 223, and no lighting occurs separately on the reflective surface 224 or the inner lens unit 222, apart from the emission surface 223. In other words, a lighting image may be implemented on the emission surface 223, and only the exterior shapes of the reflective surface 224 and the inner lens unit 222 may be visible, without any lighting.

In some embodiments, the deposit layer 240 may be provided on the outer sides of the reflective surface 224 and the inner lens unit 222. When the deposit layer 240 is formed on the outer sides of the reflective surface 224 and the inner lens unit 222, a relatively darker exterior image may be produced compared to when the deposit layer 240 is formed on the inner sides of the reflective surface 224 and the inner lens unit 222.

Additionally, when the outer lens unit 221 and the inner lens unit 222 are combined, a predetermined gap g may be formed where the emission surface 223 and the inner lens unit 222 are adjacent to each other. Alternatively, the outer lens unit 221 and the inner lens unit 222 may be combined in close contact without any gap g.

Figure 16:
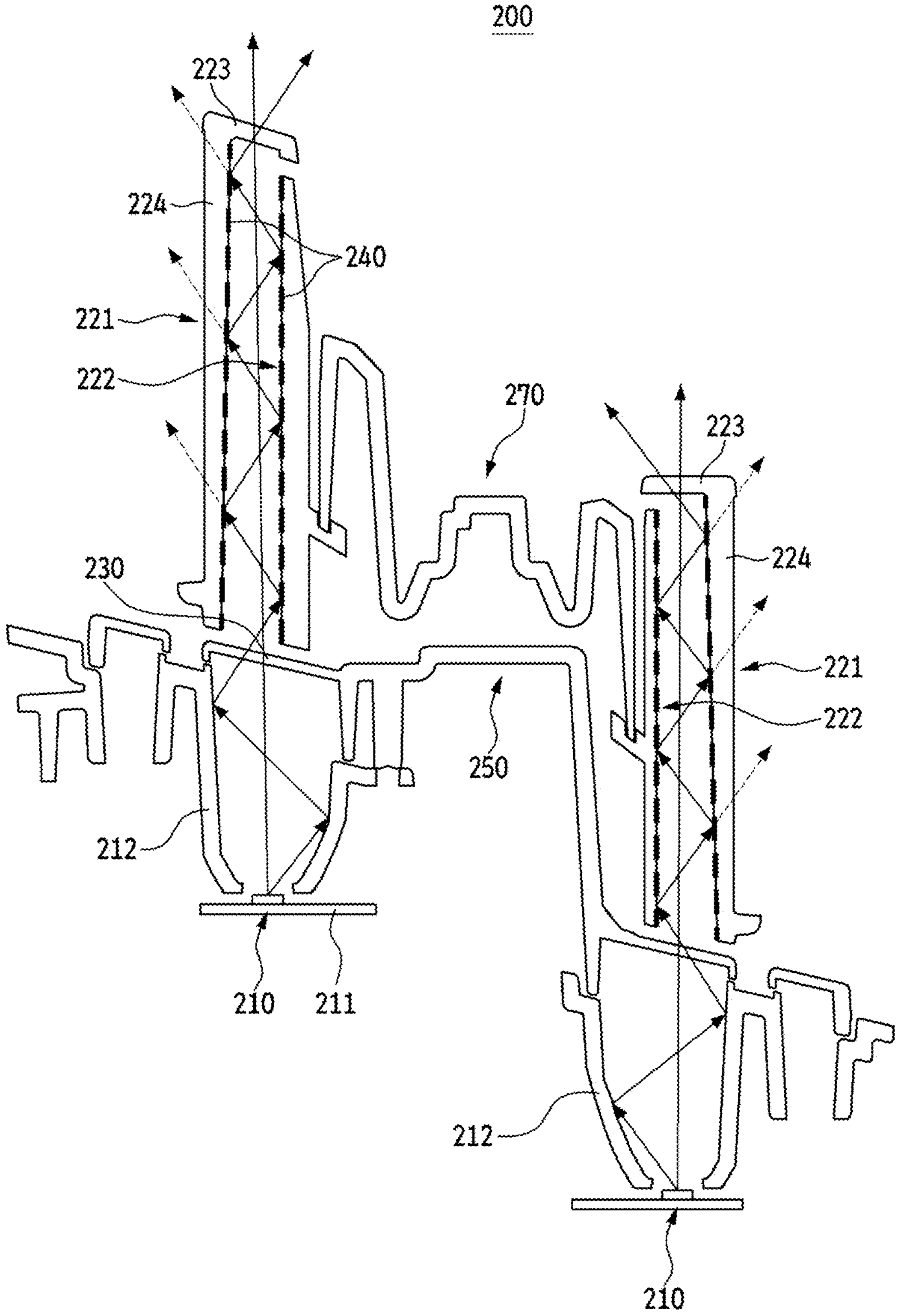
FIG. 16 is a reference diagram schematically illustrating some light passing through the reflective surface or the inner lens unit of the vehicle lamp of FIG. 13.
Figure 17:
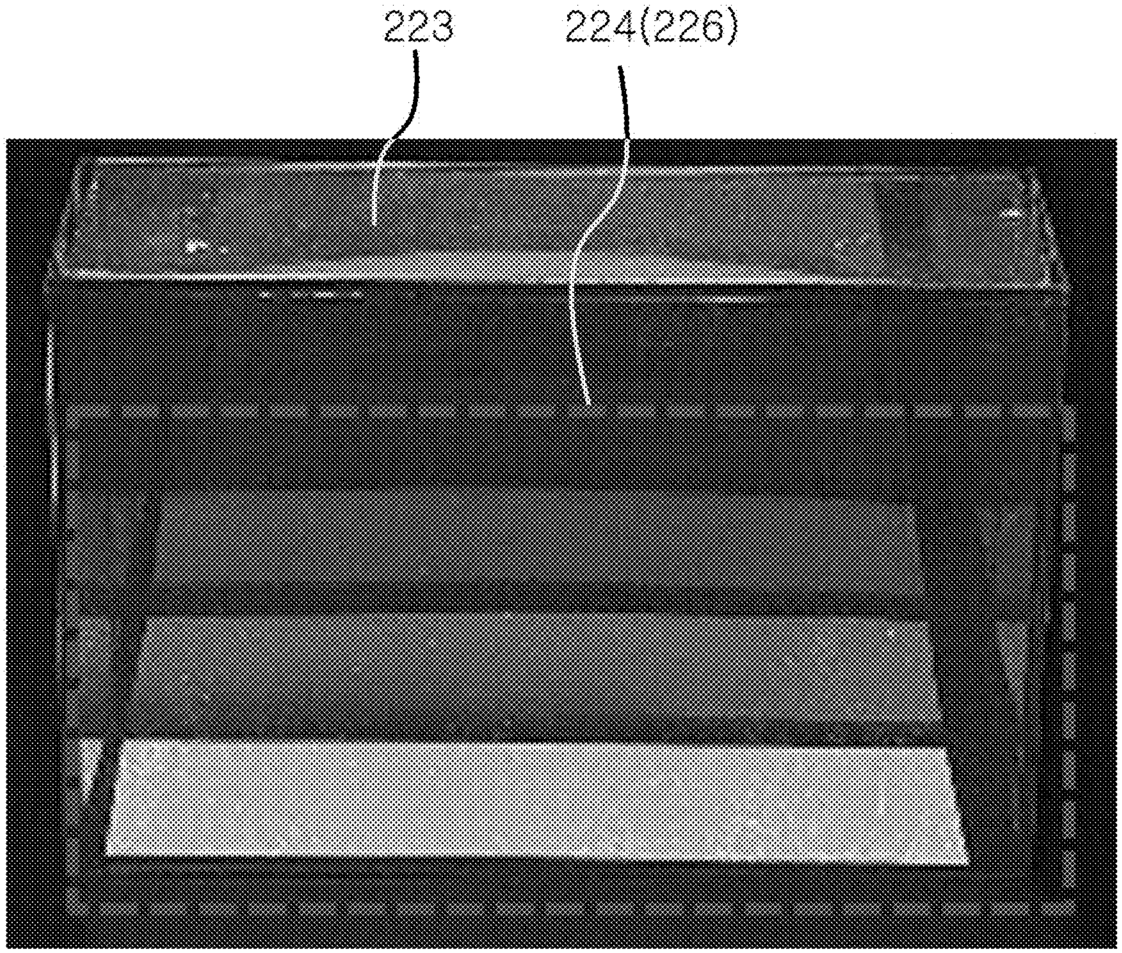
FIG. 17 is a reference photograph showing some light passing through the reflective surface or the inner lens unit of the vehicle lamp of FIG. 16.
Figure 18A:
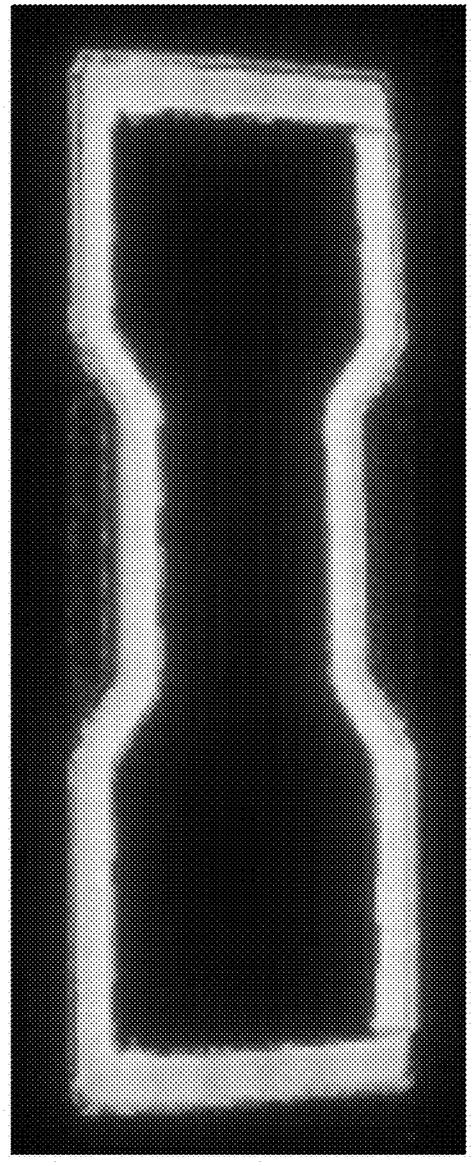
FIGS. 18A and 18B are reference photographs showing the emission surface and the reflective surface of the vehicle lamp of FIG. 16 in a lit state.
Figure 18B:
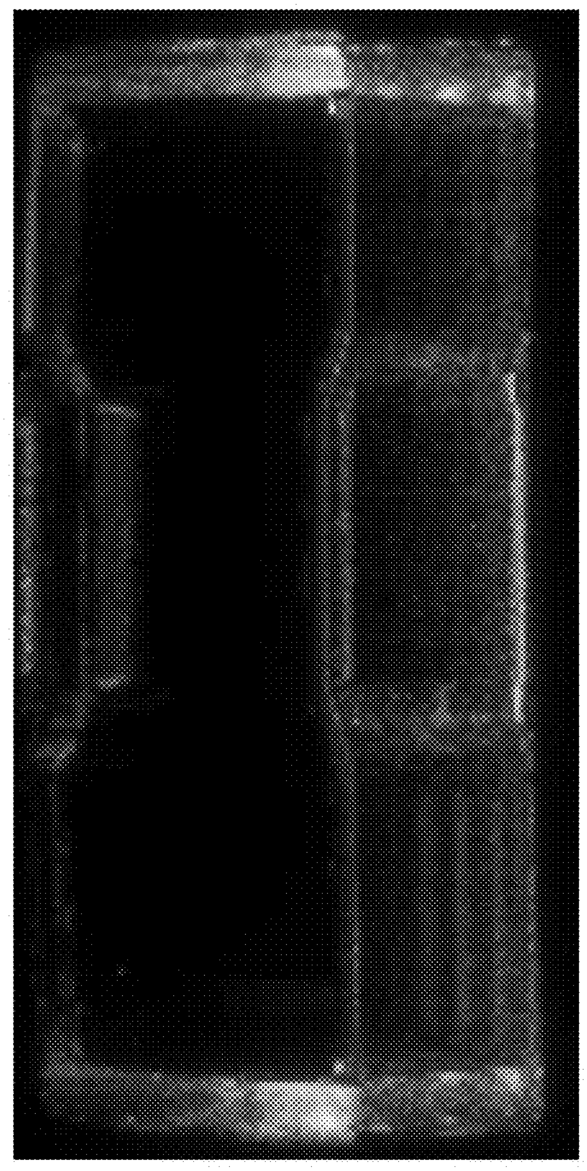

FIG. 16 is a reference diagram schematically illustrating some light passing through the reflective surface or the inner lens unit of the vehicle lamp of FIG. 13, FIG. 17 is a reference photograph showing some light passing through the reflective surface or the inner lens unit of the vehicle lamp of FIG. 16, and FIGS. 18A and 18B are reference photographs showing the emission surface and the reflective surface of the vehicle lamp of FIG. 16 in a lit state.

Referring to FIGS. 16-18B, the deposit layer 240 may be disposed on the inner sides of the reflective surface 224 and the inner lens unit 222.

In this case, the transmittance of the deposit layer 240 may range from about 1% to about 50% on the reflective surface 224 and may be about 0% on the inner lens unit 222. Therefore, while some light is emitted through the emission surface 223, creating a lighting image on the emission surface 223, some light may also be emitted through the reflective surface 224, creating a separate half-mirror image, as shown in FIG. 17. Naturally, the implementation of various shapes or brightness levels of lighting images is possible depending on the transmittance or the deposition pattern formed on the reflective surface 224.

In some embodiments, the deposit layer 240 may be implemented with a transmittance ranging from about 1% to about 50% on both the reflective surface 224 and the inner lens unit 222, such that a half-mirror image may be produced on both the reflective surface 224 and the inner lens unit 222.

FIG. 18A is a photograph showing the light-emitting state of the emission surface 223 when the transmittance of the deposit layer 240 on the reflective surface 224 and the inner lens unit 222 is 0%. In FIG. 18A, since the transmittance of the reflective surface 224 and the inner lens unit 222 is 0%, only the emission surface 223 may be lit.

FIG. 18B is a photograph showing the light-emitting state of the reflective surface 224 or the inner lens unit 222 corresponding to a half-mirror image on the reflective surface 224 or the inner lens unit 222 when the transmittance of the deposit layer 240 is between about 1% and about 50% on at least one of the reflective surface 224 and the inner lens unit 222. Referring to FIG. 18B, since the reflective surface 224 or the inner lens unit 222 are both lit along with the emission surface 223, the brightness on the emission surface 223 may become relatively lower compared to FIG. 18A. However, the combined lighting of the reflective surface 224 or the inner lens unit 222 may allow for the implementation of a 3D lighting image.

Figure 19A:
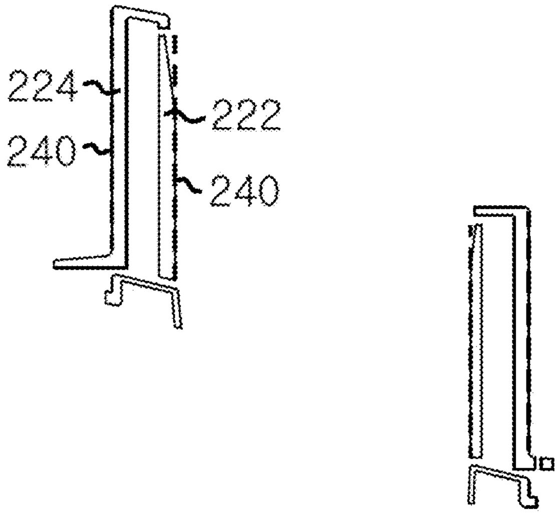
FIGS. 19A-19D are reference diagrams illustrating various embodiments for the position of the deposit layer in the vehicle lamp of FIG. 12.
Figure 19B:
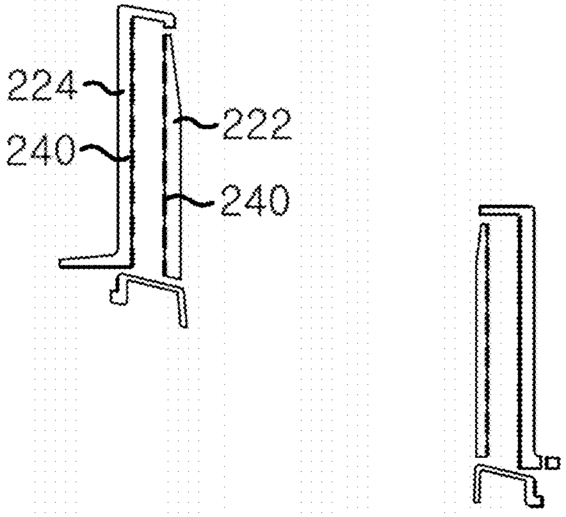
Figure 19C:
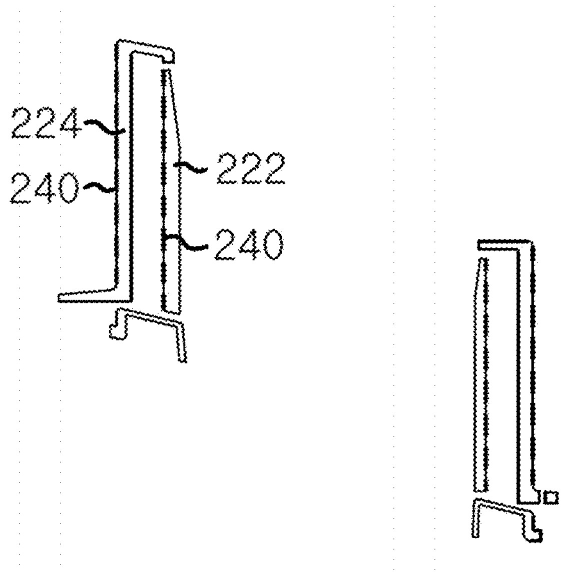
Figure 19D:
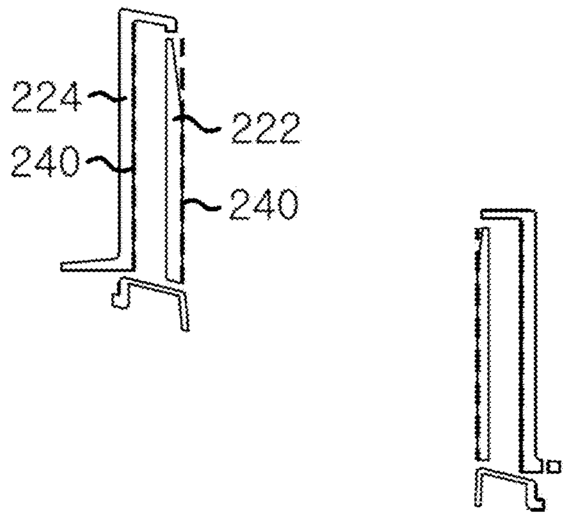

FIGS. 19A-19D are reference diagrams illustrating various embodiments for the position of the deposit layer in the vehicle lamp of FIG. 12. Referring to FIGS. 19A-19D, the deposit layer 240 may be selectively disposed on either the inner or outer side of the reflective surface 224 and either the inner or outer side of the inner lens unit 222. For example, as illustrated in FIG. 19A, the deposit layer 240 may be formed on the outer sides of both the reflective surface 224 and the inner lens unit 222. Alternatively, as illustrated in 19B, the deposit layer 240 may be formed on the inner sides of both the reflective surface 224 and the inner lens unit 222. Further, as illustrated in FIG. 19C, the deposit layer 240 may be formed on the inner side of the inner lens unit 222 and the outer side of the reflective surface 224. As illustrated in FIG. 19D, the deposit layer 240 may be formed on the outer side of the inner lens unit 222 and the inner side of the reflective surface 224.

As described above, the deposit layer 240 may be selectively formed on the inner or outer side of the reflective surface 224 and the inner or outer side of the inner lens unit 222. When the deposit layer 240 is formed on the outer side of the reflective surface 224 or the inner lens unit 222, a relatively darker exterior image may be produced compared to when the deposit layer 240 is formed on the inner side of the reflective surface 224.

Therefore, according to the aforementioned embodiments of the present disclosure, by forming a light distribution space as a cavity within a first lens unit, the overall weight of a vehicle lamp can be reduced, and by providing a deposit layer on the first lens unit, light can be totally internally reflected or partially transmitted, allowing for the implementation of a 3D lighting image. Additionally, even if the first lens unit is formed with a relatively greater thickness, a reduction in light efficiency when using a red lens can be prevented.

While the technical idea of the disclosure has been illustrated and described in detail with reference to specific embodiments, the present disclosure is not limited to the specific configurations and operations of these embodiments. Various modifications can be made within the scope of the disclosure without departing from its spirit. Therefore, such modifications should be considered to be within the scope of the disclosure, and the scope of the disclosure should be determined by the appended claims.

What is claimed is:

1. A vehicle lamp comprising:

a light source unit that generates light;

a first lens unit including an emission surface through which the light from the light source unit is emitted to exterior, and at least one reflective surface that is bent from the emission surface toward the light source unit along an outer periphery of the emission surface to reflect the light from the light source unit toward the emission surface; and a deposit layer provided on the at least one reflective surface to reflect the light from the light source unit, wherein the at least one reflective surface includes at least a first opposing region and a second opposing region, wherein the first opposing region and the second opposing region are spaced apart by a set distance to form a light distribution space therebetween, and wherein the deposit layer that is provided on at least one of the first opposing region or the second opposing region allows partial light transmission.

2. The vehicle lamp of claim 1, wherein the deposit layer is provided on outer sides of the first opposing region and the second opposing region.

3. The vehicle lamp of claim 1, wherein the deposit layer is provided on inner sides of the first opposing region and the second opposing region.

4. The vehicle lamp of claim 1, wherein the deposit layer is provided on an outer side of one of the first opposing region or the second opposing region and on an inner side of the other of the first opposing region or the second opposing region.

5. The vehicle lamp of claim 1, wherein the deposit layer that allows partial light transmission has a transmittance in a range of about 1% to about 50%.

6. The vehicle lamp of claim 1, wherein a reflective surface with the deposit layer that allows partial light transmission emits light corresponding to a half-mirror image.

7. The vehicle lamp of claim 1, wherein the deposit layer is formed by depositing a thin film containing at least one of aluminum, nickel, or chrome on the at least one reflective surface, or by insert-molding a chrome-deposited film onto the at least one reflective surface.

8. A vehicle lamp comprising:

a light source unit that generates light;

a first lens unit including an emission surface through which the light from the light source unit is emitted to exterior, and at least one reflective surface that is bent from the emission surface toward the light source unit along an outer periphery of the emission surface to reflect the light from the light source unit toward the emission surface; and a deposit layer provided on the at least one reflective surface to reflect the light from the light source unit, wherein the first lens comprises:

an outer lens unit that includes the emission surface and the at least one reflective surface; and an inner lens unit that is extended between the light source unit and the emission surface along an inner periphery of the emission surface to face the reflective surface.

9. The vehicle lamp of claim 8, wherein the outer lens unit and the inner lens unit are detachably coupled.

10. The vehicle lamp of claim 8, further comprising:

a connection means that fixes the outer lens unit and the inner lens unit at set positions; and a bezel that is disposed on the connection means and bears no overlapping region with the emission surface with regards to a direction perpendicular to the emission surface.

11. The vehicle lamp of claim 10, wherein, when the outer lens unit and the inner lens unit are installed on the connection means, a gap of a predetermined distance is formed where the emission surface and a distal end of the inner lens unit are adjacent to each other.

12. The vehicle lamp of claim 8, wherein the deposit layer is provided on outer sides of the first opposing region and the second opposing region.

13. The vehicle lamp of claim 8, wherein the deposit layer is provided on inner sides of the first opposing region and the second opposing region.

14. The vehicle lamp of claim 8, wherein the deposit layer is provided on an outer side of one of the first opposing region or the second opposing region and on an inner side of the other of the first opposing region or the second opposing region.

15. A vehicle lamp comprising:

a light source unit that generates light;

a first lens unit including an emission surface through which the light from the light source unit is emitted to exterior, and at least one reflective surface that is bent from the emission surface toward the light source unit along an outer periphery of the emission surface to reflect the light from the light source unit toward the emission surface; and a deposit layer provided on the at least one reflective surface to reflect the light from the light source unit, wherein the at least one reflective surface includes at least a first opposing region and a second opposing region, wherein the first opposing region and the second opposing region are spaced apart by a set distance to form a light distribution space therebetween, and wherein the vehicle lamp further comprises:

a second lens unit interposed between the light source unit and the first lens unit to refract the light from the light source unit toward the light distribution space.

16. The vehicle lamp of claim 15, wherein the deposit layer is provided on outer sides of the first opposing region and the second opposing region.

17. The vehicle lamp of claim 15, wherein the deposit layer is provided on inner sides of the first opposing region and the second opposing region.

18. The vehicle lamp of claim 15, wherein the deposit layer is provided on an outer side of one of the first opposing region or the second opposing region and on an inner side of the other of the first opposing region or the second opposing region.

* * * * *